UNITED STATES PATENT OFFICE 2,670,346

COPPERABLE DISAZO DYESTUFFS

Werner Bossard, Riehen, near Basel, Switzerland, assignor to J. R. Geigy A. G., Basel, Switzerland, a Swiss firm No Drawing. Application January 21, 1952, Serial No. 267,502

Claims priority, application Switzerland February 7, 1951

8 Claims. (Cl. 260—181)

The present invention concerns the production of copperable disazo dyestuffs characterised by their very good drawing power on to cellulose fibres and the excellent fastness to washing of the after-coppered cellulose dyeings attained therewith.

Disazo dyestuffs have been described in U. S. Patent No. 2,158,843 which can be produced by coupling tetrazotised 4,4'-diaminodiphenyl-3,3'-diglycolic acid of the general formula:

with 2 mols of 2-amino-5-hydroxynaphthalene-7-sulphonic acid or its substitution compounds. Among others, N-phenyl compounds are to be understood by this definition, particularly the 2-phenylamino-, 2-(4'-methoxyphenylamino)-, 2-(3'-carboxyphenylamino)- or 2-(4'-hydroxy-3'-carboxyphenylamino)- compounds. These dyestuffs are characterised by the clear blue shade of their after-coppered cellulose dyeings which have very good fastness to light and washing.

It has now been found that disazo dyestuffs, the coppered cellulose dyeings of which have the same pure shade, can be produced if 1 mol of tetrazotised 4,4'-diaminodiphenyl-3,3'-diglycolic acid is coupled with 2 mols of a 2-(4'-acylaminophenylamino)-5-hydroxynaphthalene-7-sulphonic acid. These dyestuffs are superior to the described known dyestuffs in their increased drawing power on to cellulose fibres from a bath containing Glauber's salt and in the better fastness to washing of their after-coppered cellulose dyeings.

Radicals derived from monobasic organic aliphatic carboxylic acids and also those derived from carbonic acid, i. e. radicals of carbonic acid half esters come into consideration as acyl radicals in the 2-(4'-acylamino-phenylamino)-5-hydroxynaphthalene-7-sulphonic acids usable according to the present invention. However, to ensure that the dyestuffs according to the present invention are sufficiently water soluble, higher molecular acyl radicals are to be avoided. As suitable radicals may be named: radicals of lower fatty acids (lower alcoyl radicals) and the alkoxy carbonyl radicals derived from lower alcohols, particularly suitable also are those derived from alkoxy substituted lower alcohols.

The coupling of the 2-(4'-acylamino-phenylamino)-5-hydroxynaphthalene-7-sulphonic acid with the tetrazo component usable according to this invention takes place advantageously in aqueous solution or suspension in the presence of sodium carbonate and a small excess of the coupling component.

In the form of their alkali salts, the disazo dyestuffs according to this invention are dark powders which dissolve in water and in concentrated sulphuric acid with a pure blue colour. It is often advantageous to mix them with alkali salts of phosphoric acid, e. g. sodium pyrophosphate, to increase their water solubility. As already described above, they dye cellulose fibres from a bath containing Glauber's salt in pure blue shades and on after-coppering produce very pure cellulose dyeings which are fast to light and washing.

The direct cellulose dyeings can be coppered either in the dyebath or a fresh bath with the usual copper salts, e. g. with copper sulphate or copper acetate in neutral or weakly acid aqueous solution. If desired, copper compounds which are stable to alkali can also be used such as are obtained for example by reacting copper sulphate with sodium tartrate in a soda alkaline bath.

The following examples illustrate the invention without limiting it in any way. Where not otherwise stated, parts are given as parts by weight, and the temperatures are in degrees centigrade.

*Example 1*

33.2 parts of 4,4'-diaminodiphenyl-3,3'-diglycolic acid in the form of its disodium salt are dissolved in 500 parts of water at 20° and cooled to 0° by the addition of ice. 70 parts of concentrated hydrochloric acid and immediately afterwards 13.8 parts of sodium nitrite as 30% solution are added. On completion of the diazotisation, the excess hydrochloric acid is neutralised with sodium carbonate solution until a sample gives a violet reaction to congo paper. The clear tetrazo solution is poured into a solution of 77 parts of 2-(4'-acetylamino-phenylamino)-5-hydroxynaphthalene-7-sulphonic acid and 64 parts of sodium carbonate in 1500 parts of water at 5°. The next day the product is heated to 80°, 2% common salt, calculated on the volume obtained, is added and the disazo dyestuffs of the formula:

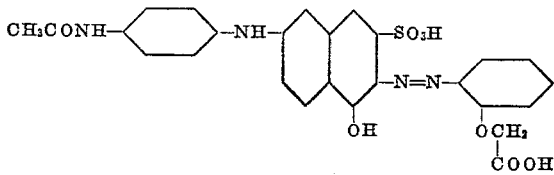

which has precipitated is filtered off. The impurities resulting from the coupling are washed away with 2% common salt solution at 80°. When dry, the dyestuff is a dark powder which dissolves with a blue colour in water and in concentrated sulphuric acid. It has a very good drawing power on to cellulose fibres, which on being after-coppered are dyed in clear blue shades of excellent fastness to washing and light.

If, instead of 77 parts of 2-(4'-acetylaminophenylamino)-5 - hydroxynaphthalene - 7 - sulphonic acid, 79.8 parts of 2-(4'-propionylaminophenylamino)-5 - hydroxynaphthalene - 7 - sulphonic acid, 82.6 parts of 2-(4'-butyrylaminophenylamino)-5 - hydroxynaphthalene - 7 - sulphonic acid or 84.0 parts of 2-(4'-chloracetylamino-phenylamino)-5-hydroxynaphthalene-7 - sulphonic acid are used and otherwise the same procedure is followed, similar dyestuffs are obtained which produce pure blue dyeings with the same excellent fastness properties.

*Example 2*

33.2 parts of 4.4'-diaminodiphenyl-3.3'-diglycolic acid are tetrazotised as described in Example 1 and then coupled with an aqueous solution of 89.2 parts of 2-(4'-carbomethoxyethoxyaminophenylamino)-5 - hydroxynaphthalene - 7 - sulphonic acid and 64 parts of sodium carbonate.

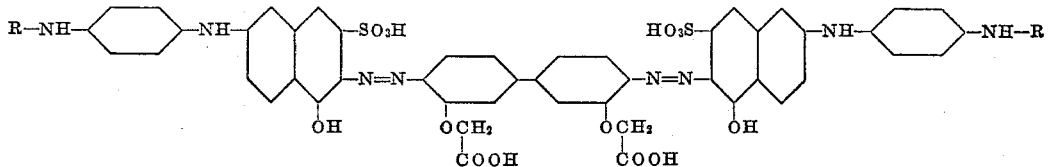

The next day the disazo dyestuff of the formula:

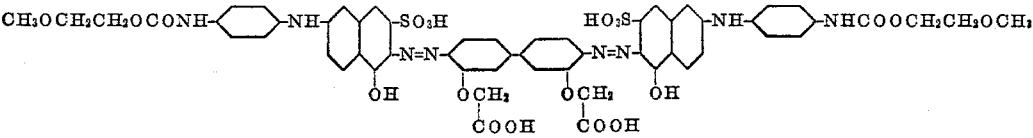

is precipitated at 80° with 2% of common salt, filtered off, washed with 2% salt solution at 60° and dried. The dyestuff is a dark powder which

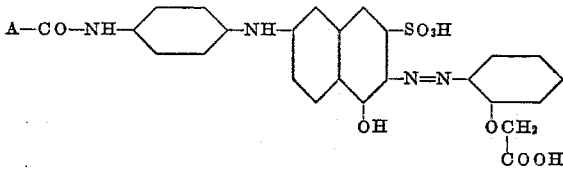

dissolves in water and concentrated sulphuric acid with a blue colour. It dyes natural or regenerated cellulose fibres in pure blue shades. The shade of the dyeings is hardly altered on being treated with copper salts and they have excellent fastness to washing and light.

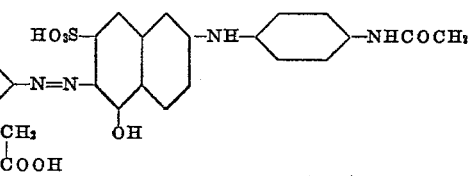

If, in the above example, the 89.2 parts of 2-(4' - carbomethoxyethoxy - aminophenylamino)-5-hydroxynaphthalene-7-sulphonic acid are replaced by 92.0 parts of 2-(4'-carbethoxyethoxyamino - phenylamino)-5 - hydroxynaphthalene-7-sulphonic acid, 83.1 parts of 2-(4'-carbethoxyamino - phenylamino)-5-hydroxynaphthalene-7-sulphonic acid, dyestuffs with almost the same shades and fastness properties are obtained.

*Example 3*

1 part of the disazo dyestuff obtained according to Example 2 and 2 parts of soda are dissolved in a dye bath containing 3000 parts of water. 100 parts of cotton are entered at 40–50°, the bath is heated to 90–95° within 30 minutes, 30 parts of sodium sulphate are added and dyeing is performed for 45 minutes at this temperature. The dyebath is then completely exhausted. The dyed goods are rinsed cold and after-treated for 30 minutes in a fresh bath containing 2 parts of crystallised copper sulphate in 2000 parts of water and 2 parts of 30% acetic acid. The goods are rinsed and dried in the usual way. The cotton is dyed in clear blue shades which are excellently fast to washing and light.

What I claim is:

1. A disazo dyestuff corresponding to the general formula:

wherein R represents a low molecular aliphatic carboxylic acid acyl radical.

2. A disazo dyestuff corresponding to the general formula:

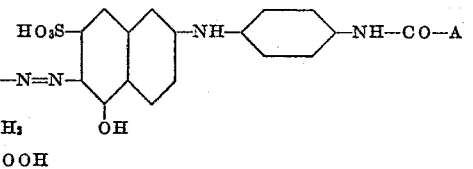

wherein A represents a low molecular alkyl radical.

3. A disazo dyestuff corresponding to the general formula:

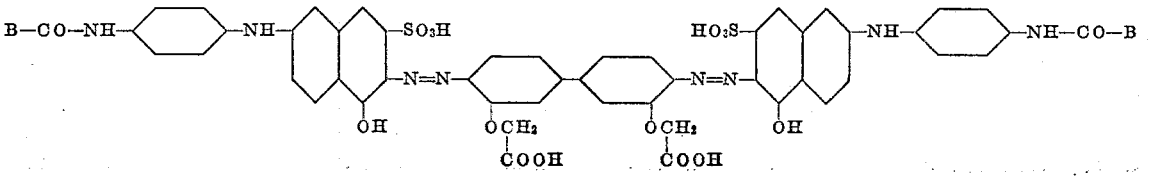

wherein B represents a low molecular alkoxy radical.

4. A disazo dyestuff corresponding to the formula:

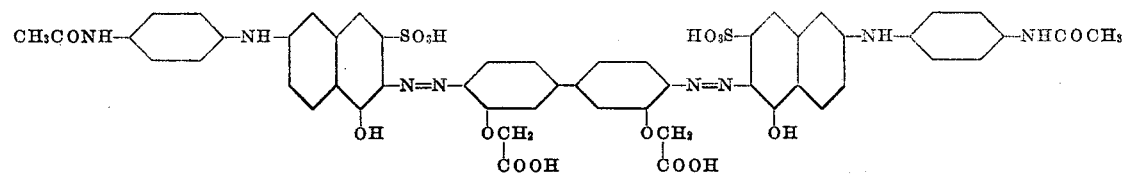

5. A disazo dyestuff corresponding to the formula:

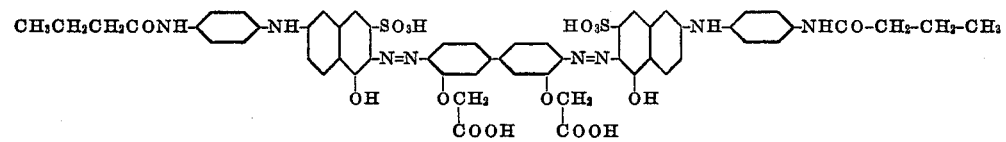

6. A disazo dyestuff corresponding to the formula:

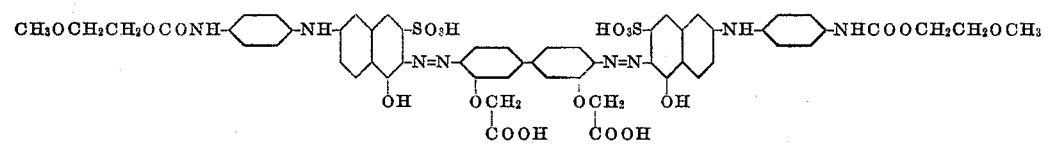

7. A disazo dyestuff corresponding to the formula:

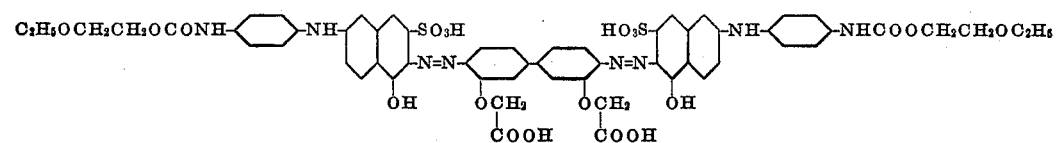

8. A disazo dyestuff corresponding to the formula:

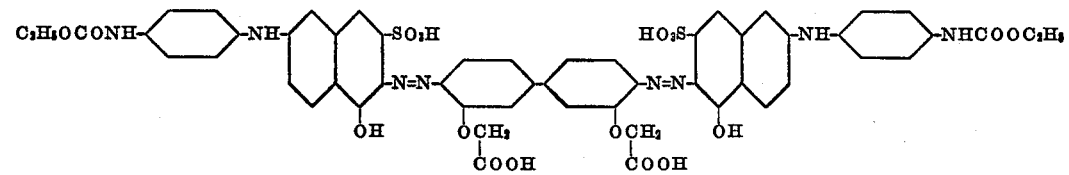

WERNER BOSSARD.

References Cited in the file of this patent

UNITED STATES PATENTS

| Number | Name | Date |
|---|---|---|
| 2,158,843 | Taube et al. | May 16, 1939 |
| 2,384,419 | Fleischhauer et al. | Sept. 4, 1945 |

FOREIGN PATENTS

| Number | Country | Date |
|---|---|---|
| 261,856 | Switzerland | Sept. 1, 1949 |